Feb. 1, 1927.
W. A. JAMES
1,615,981
BROOMCORN HARVESTER AND CLEANER
Filed Oct. 7, 1924
3 Sheets-Sheet 1
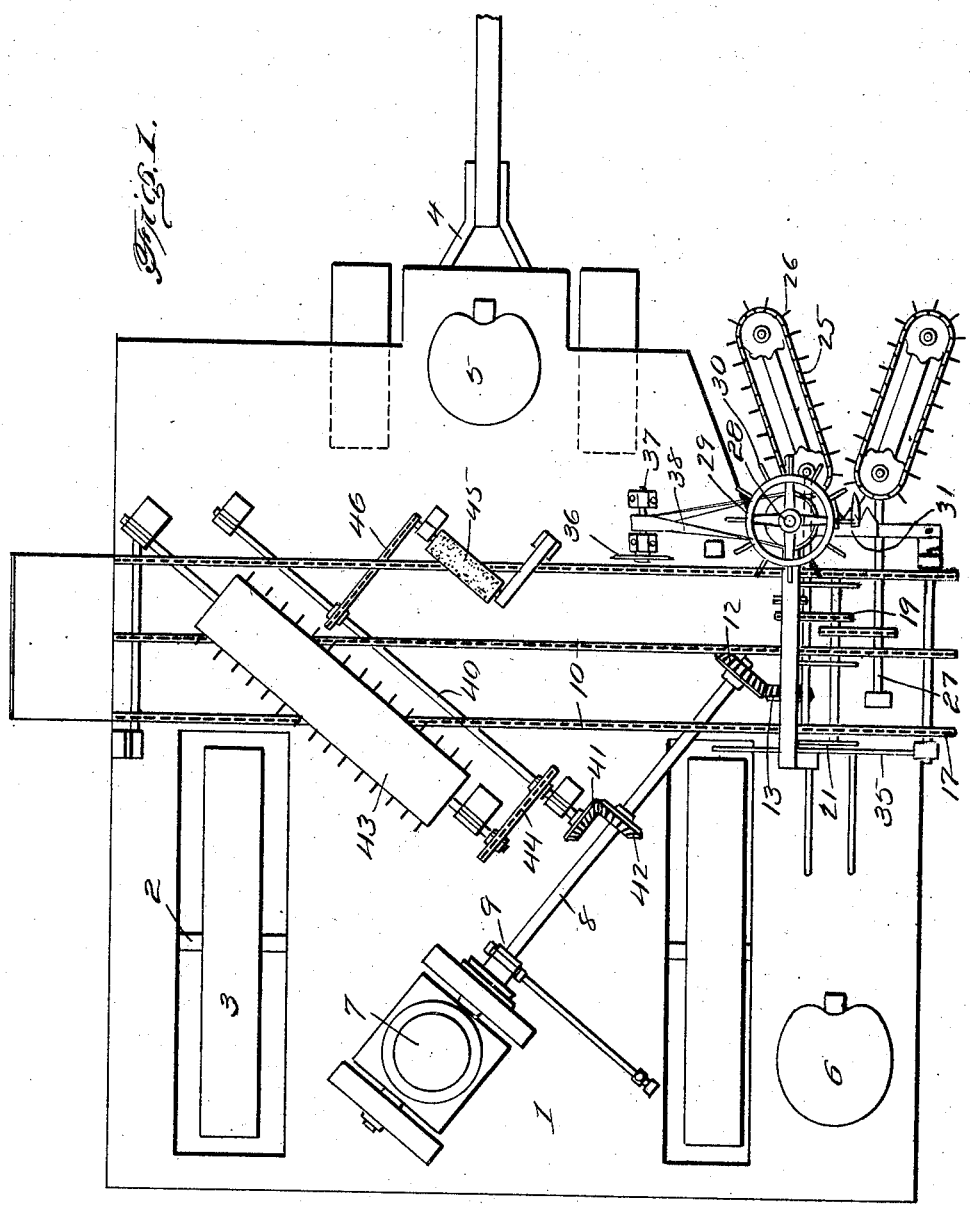
Inventor
W. A. James.
By Clarence A. O'Brien
Attorney Feb. 1, 1927.
W. A. JAMES
1,615,981
BROOMCORN HARVESTER AND CLEANER
Filed Oct. 7, 1924     3 Sheets-Sheet 2
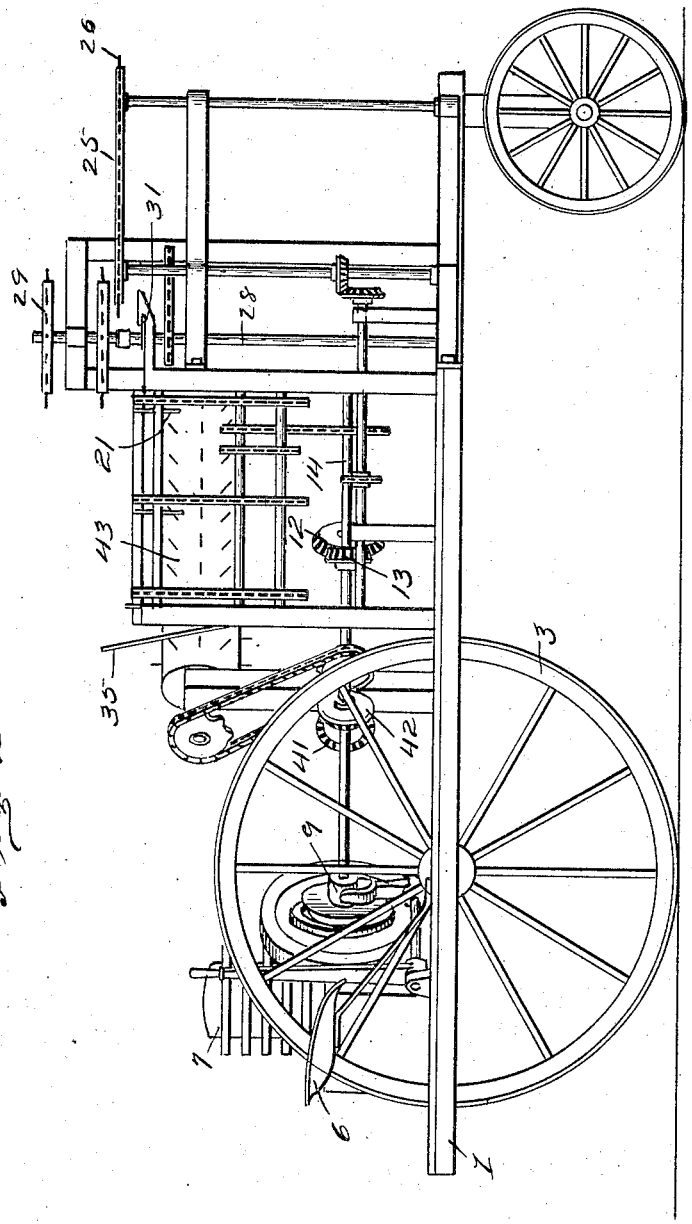
Inventor
W. A. James.
By Clarence A. O'Brien
Attorney

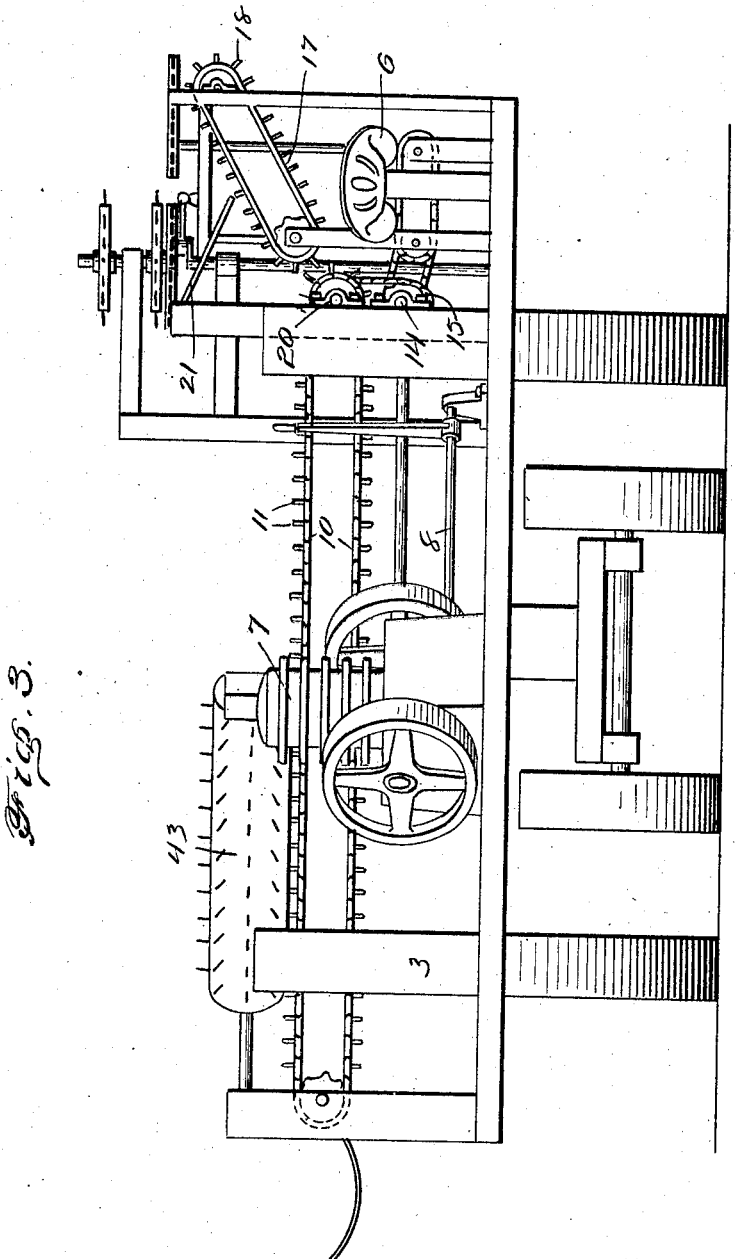

Patented Feb. 1, 1927.

1,615,981

UNITED STATES PATENT OFFICE.

WILLIAM ARTER JAMES, OF HUGOTON, KANSAS.

BROOMCORN HARVESTER AND CLEANER.

Application filed October 7, 1924. Serial No. 742,178.

This invention relates to machines especially adapted to be used for harvesting broom corn and for cleaning the heads of the corn and it consists in the novel features hereinafter described and claimed.

An object of the invention is to provide in the unitary assemblage of a machine, means for cutting the heads of the corn from the stalks while the stalks are standing in the soil, means for gathering or drawing the heads over the cutting apparatus, means for bending the heads over the cutting apparatus at the time that the heads are being severed from the stalks, means for conveying the heads away from the cutting apparatus and including means for aligning the heads and means for removing the butts from the heads whereby the heads of the corn are made of uniform length and means for brushing the seed from the heads of corn and means for brushing the butts or foliage from the heads.

In the accompanying drawings:—

Figure 1 is a top plan view of the broom corn harvester,

Figure 2 is a side elevational view thereof.

Figure 3 is a rear end elevational view thereof.

The broom corn harvester comprises a platform 1 which is mounted upon an axle 2 and the said axle in turn is supported upon ground wheels 3. A truck 4 is disposed under the forward end of the platform 1 in a usual manner and a driver's seat 5 is mounted upon the forward portion of the platform. An operator's seat 6 is mounted upon the rear portion of the platform.

An engine 7 is mounted upon the intermediate portion of the platform and its shaft is alined with a shaft 8 also mounted upon the platform and disposed substantially diagonally thereof. A lever operated clutch mechanism 9 is provided for connecting the shaft 8 with the shaft of the engine 7.

A series of endless chains 10 is arranged above the platform and the said chains move in orbits and are driven by beveled pinions 12 and 13 carried by the shaft 8 and one of the supporting shafts of the said chains 10 respectively. The chains 10 are provided with upstanding teeth 11. The pinion 13 is mounted upon a shaft 14, best shown in Figure 3, and a sprocket chain 15 operatively connects the shafts 14 with one of the shafts about which the chains 10 are trained. Inclined chains 17 are mounted for orbital movement at one side of the platform and at one end of the series of chains 10, and the chains 17 are provided with outstanding pins 18. The chains 17 are driven by a sprocket chain 19 from the adjacent shafts 20 about which the chains 10 are trained. Inclined rods 21 are located above the chains 17 and are adapted to guide and direct the heads of the corn downwardly upon the chains 17 and disposed transversely of said chain. From the chains 17 the heads of corn are carried to the chains 10 and deposited upon the upper runs thereof and between the teeth 11 carried by the said chains 10.

Corn head gathering chains 25 are mounted for orbital movement at the forward portion of the platform 1 and elevated above the said platform and the said chains 25 carry outstanding teeth 26. The chains 25 are operated by shafts 27 which in turn are operatively connected with the shafts 8 so that the inner runs of the chains 20 move the heads.

A vertically disposed shaft 28 is journaled for rotation at the forward portion of the platform and is operatively connected with the shaft 8. Spaced wheels 29 are carried at the upper portion of the shaft 28 and the said wheels are provided with outstanding radially disposed teeth 30. A knife blade 31 is located below the wheels 29 and is operatively connected with the shaft 28. The blade 31 and its cooperating elements serve as the cutting apparatus of the harvester.

As the harvester moves over the surface of the soil the row of standing corn stalks is received between the chains 25 and the teeth 26 upon the said chains gather the heads of the stalks inwardly and present them to the teeth 30 carried by the wheels 29. The said teeth 30 bend the heads rearwardly and over the knife blade 31 and at the same time the knife blade 31 is reciprocated whereby the heads of the corn are severed from the standing stalks. The severed heads are carried rearwardly by the teeth 30 and the said heads are deposited upon the inclined rods 21. From the said rods 21 the heads slide down and fall upon the chains 17. From the chains 17 the heads of the corn are passed upon the chains 10 as hereinbefore described. A guide 35 is mounted at the rear of the chains 17 and as the heads of the corn are deposited upon the chains 17 the tip ends of the heads strike the guide 35 whereby the heads of the corn are properly aligned upon the chains 17. A knife 36 is mounted upon a shaft 37 which is journaled in advance of the forward chain 10 and at a point spaced therefrom. The shaft 37 is driven by a belt 38 which in turn is driven from the shaft 28 hereinbefore described. As the stalks pass by the knife 36 and upon the chains 10 the said knife encounters the butt ends of the said stalks and severs the butts from the heads.

A shaft 40 is journaled under the chains 10 and is operatively connected with the shafts 8 by means of intermeshing beveled pinions 41 and 42. The shaft 40 is disposed obliquely with relation to the chains 10. A cylindrical brush 43 is journaled for rotation above the upper runs of the chains 10 and its shaft is operatively connected with the shaft 40 by means of a sprocket chain 44 said brush 43 is extended obliquely across the conveyor chains. A brush 45 is journaled for rotation over the forward chain 10 and is disposed obliquely with relation thereto. The shaft of the brush 45 is operatively connected with the shaft 40 by means of a sprocket chain 46. The purpose in having the brush 43 disposed obliquely to the chains 10 is to save the fiber of the broom corn and to remove the seed and trash from the brush. The purpose of having the brush 45 obliquely disposed to the chains 10 is that this brush functions as a booter and as the stem that holds the fiber should go through it in an oblique position, it prevents the fiber from shivering or damaging the stem that holds the brush. This oblique position of the brush 45 also removes foliage from the chains.

After the heads of the corn leave the knife 36 they are carried under the brush 45 which is rotating and the said brush removes the butt ends from the head and also removes any foliage from the heads which may be adhering thereto. The heads are then carried under the brush 43 which is rotating and the said brush removes any seed which may be adhering to the heads.

From the foregoing description taken in conjunction with the accompanying drawing it will be seen that a broom corn harvester and head cleaner of simple and durable structure is provided and that the machine includes means for gathering the heads and presenting them to a cutting apparatus, means for bending the heads over the cutting apparatus, means for receiving and aligning the heads, means for conveying the aligned heads away from the cutting apparatus and means for removing the butt ends from the heads and for removing the seed from the heads.

Having thus described the invention, what I claim is:—

A broom corn feeder including, in combination, a platform, an endless conveyor trained in an orbit across the platform at right angles to the median longitudinal dimensions thereof, means for delivering heads to the endless conveyor at one end thereof, a brush mounted above the platform obliquely across the endless conveyor, said brush being adapted to engage the heads for brushing the seeds therefrom, a second brush mounted obliquely across the endless conveyor parallel to and spaced from the first brush, members for supporting the two brushes for rotary movement above the platform, a shaft journaled above the platform and extending below the endless conveyor in parallelism with the axes of the brushes, sprockets on the shaft, sprockets rotatable with the brushes, chains trained over the sprockets, a drive shaft operatively connected with the first mentioned shaft and being at right angles thereto.

In testimony whereof I affix my signature.

WILLIAM ARTER JAMES.